US007359781B2

(12) United States Patent
Foo et al.

(10) Patent No.: US 7,359,781 B2
(45) Date of Patent: Apr. 15, 2008

(54) METHOD AND APPARATUS FOR DETERMINING SYMMETRIC AND ASYMMETRIC CRASH EVENTS WITH IMPROVED MISUSE MARGINS

(75) Inventors: Chek-Peng Foo, Ann Arbor, MI (US); Huahn-Fern Yeh, Novi, MI (US); Paul Leo Sumner, Farmington Hills, MI (US); Dongkyun Yoo, Plymouth, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 457 days.

(21) Appl. No.: 11/011,350

(22) Filed: Dec. 14, 2004

(65) Prior Publication Data

US 2006/0129295 A1 Jun. 15, 2006

(51) Int. Cl.
*B60R 22/00* (2006.01)
(52) U.S. Cl. ............... 701/45; 701/46; 280/728.1; 280/732; 280/735; 280/806; 200/61.53
(58) Field of Classification Search ............... 701/45, 701/46; 180/268, 273, 274, 282; 200/61.53; 280/728.1, 732, 735, 806
See application file for complete search history.

(56) References Cited

U.S. PATENT DOCUMENTS

| 5,935,182 | A | 8/1999 | Foo et al. | |
|---|---|---|---|---|
| 5,967,548 | A | 10/1999 | Kozyreff | |
| 6,439,007 | B1 | 8/2002 | Foo et al. | |
| 6,520,536 | B2 * | 2/2003 | Foo et al. | 280/735 |
| 6,529,810 | B2 * | 3/2003 | Foo et al. | 701/45 |
| 6,549,836 | B1 | 4/2003 | Yeh et al. | |
| 6,776,435 | B2 * | 8/2004 | Foo et al. | 280/735 |
| 6,810,313 | B2 * | 10/2004 | Cooper et al. | 701/45 |
| 7,278,657 | B1 * | 10/2007 | McCurdy | 280/735 |
| 2005/0006886 | A1 * | 1/2005 | Foo et al. | 280/735 |
| 2006/0232052 | A1 * | 10/2006 | Breed | 280/735 |
| 2006/0254848 | A1 * | 11/2006 | Foo et al. | 180/274 |
| 2006/0255575 | A1 * | 11/2006 | Foo et al. | 280/735 |
| 2007/0005207 | A1 * | 1/2007 | Foo et al. | 701/45 |

FOREIGN PATENT DOCUMENTS

| DE | 195 81 772 T1 | 8/1997 |
|---|---|---|
| DE | 199 36 819 A1 | 9/2000 |
| DE | 102 23 522 A1 | 4/2003 |

* cited by examiner

*Primary Examiner*—Thomas Black
*Assistant Examiner*—McDieunel Marc
(74) *Attorney, Agent, or Firm*—Tarolli, Sundheim, Covell & Tummino LLP

(57) ABSTRACT

An apparatus (10) for controlling a multistage actuatable occupant restraining system (14, 18) of a vehicle includes a crash sensor (32) sensing crash acceleration at a substantially central location of the vehicle. A crush zone accelerometer (40, 42) is provides a crush zone crash acceleration signal. A controller (50) a crash velocity value and a crash displacement value in response to the crash acceleration signal. A plurality a predetermined crash velocity as a function of crash displacement threshold maps (152-172) is provided, two of the plurality of threshold maps (170, 172) relating to a second stage (92, 96) of said multistage actuatable occupant restraining system. The selects one of the two threshold maps relating to the second stage of in response to the crush zone acceleration signal and controls second stage actuation in response to a comparison of the crash velocity signal against the selected one of the two threshold maps (170, 172). Improved misuse margins are also provided as well as deployment mappings based on symmetric and asymmetric crash detection.

8 Claims, 14 Drawing Sheets

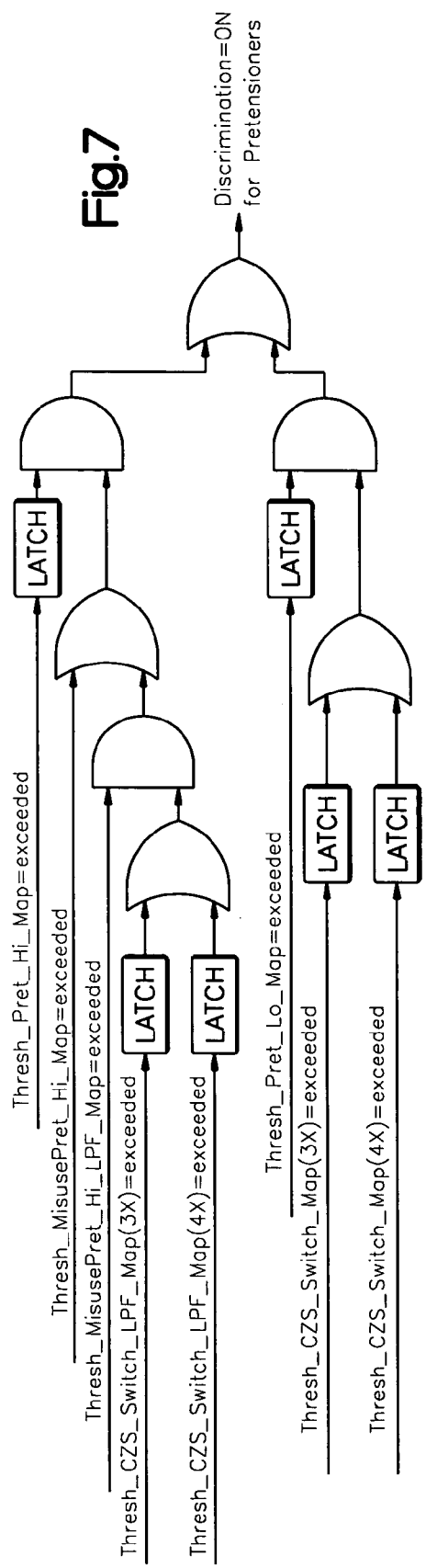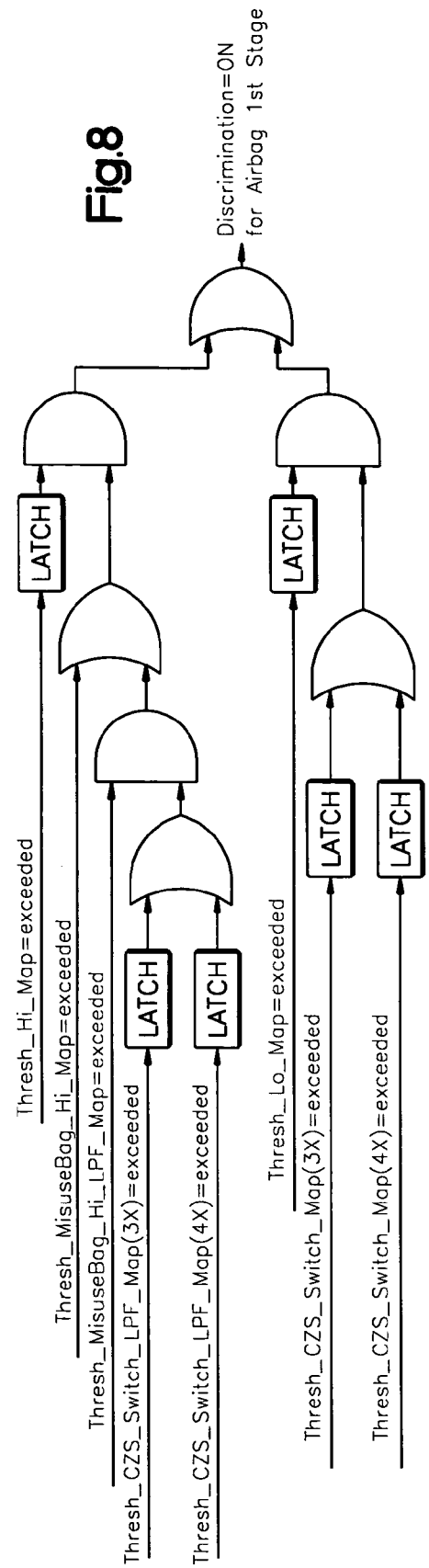

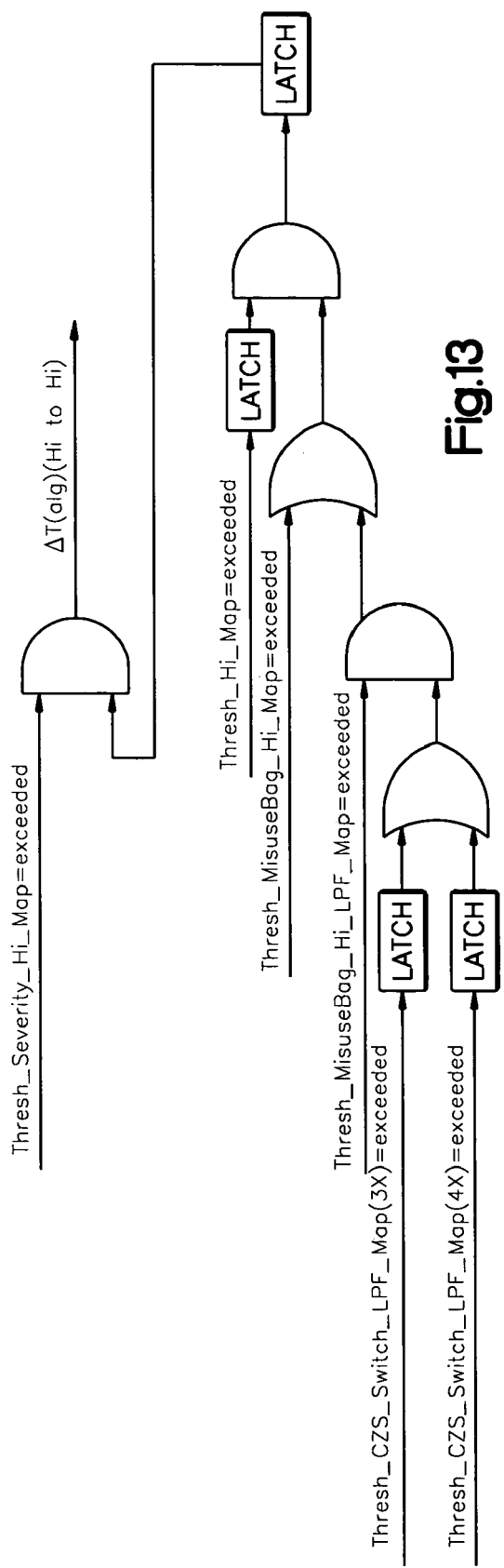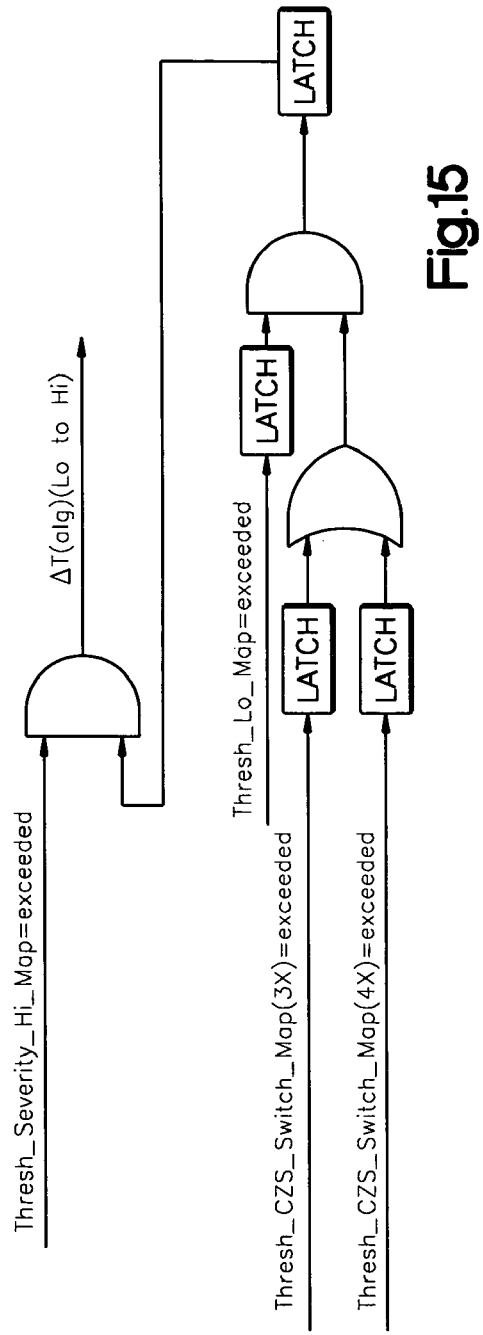

METHOD AND APPARATUS FOR DETERMINING SYMMETRIC AND ASYMMETRIC CRASH EVENTS WITH IMPROVED MISUSE MARGINS

TECHNICAL FIELD

The present invention relates to an apparatus and method for determining crash events in a vehicle. More particularly, the present invention relates to a method and apparatus for determining symmetric and asymmetric crash events in a vehicle with improved misuse margins.

BACKGROUND OF THE INVENTION

Actuatable occupant restraining systems for use in vehicles are known in the art. Such restraining systems may include one or more collision sensing devices for sensing vehicle crash acceleration (vehicle deceleration during the crash event). Air bag restraining systems include an electrically actuatable igniter, referred to as a squib. When the collision sensing device senses a deployment crash event and provides a signal indicative thereof, an electrical current of sufficient magnitude and duration is passed through the squib to ignite the squib. When ignited, the squib initiates the flow of inflation fluid into an air bag from a source of inflation fluid, as is known in the art.

A known type of collision sensing device used in actuatable occupant restraining systems is mechanical in nature. Still other known types of collision sensing devices include an electrical transducer, such as an accelerometer, for sensing vehicle crash acceleration. Actuatable restraining systems using an accelerometer as a crash or collision sensor further include circuitry, e.g., a controller such as a microcomputer, for monitoring and analyzing the output of the accelerometer. The controller performs a crash algorithm using the accelerometer output signal for discriminating between a deployment crash event and a non-deployment crash event. When a deployment crash event is determined to be occurring, the restraining device is actuated, e.g., an air bag is deployed.

One particular type of occupant restraining system known in the art is a multi-stage occupant restraining system that includes more than one actuatable stage associated with a single air bag. In a multi-stage air bag restraining system, air bag inflation is the result of the control of a multi-stage inflator. Such multi-stage air bag systems may have two or more separate sources of inflation fluid controlled by actuation of individual squibs associated with the same air bag. Control arrangements control the actuation of the multiple stages based on, for example, a timing function between the first actuation and the second actuation. A problem may arise in determining the beginning of the crash event to start the timing process. False starts (and, in turn, false endings) could occur due to signals being generated that are the result of road noise and not a crash event.

U.S. Pat. No. 6,549,836 to Yeh et al. discloses a method and apparatus for controlling an actuatable occupant restraining device having a plurality of actuatable stages. The apparatus includes a crash sensor for sensing crash acceleration and provides a crash acceleration signal indicative thereof. A controller determines a velocity value and a displacement value from the crash acceleration signal. A side impact sensor and side impact crash event circuit determines if a side impact crash event is occurring. If a side impact crash event is occurring, the threshold values of the immunity box are adjusted.

SUMMARY OF THE INVENTION

The present invention is directed to an apparatus for controlling a multistage actuatable occupant restraining system of a vehicle comprising a crash sensor sensing crash acceleration at a substantially central location of the vehicle and providing a crash acceleration signal indicative of sensed crash acceleration. A crush zone accelerometer is provided spaced from the passenger compartment at a crush zone location of the vehicle and provides a crush zone crash acceleration signal indicative of crash acceleration sensed at the crush zone location. A controller is connected to the central crash sensor for determining a crash velocity value and a crash displacement value in response to the crash acceleration signal. The apparatus further comprises a plurality a predetermined crash velocity as a function of crash displacement threshold maps, two of the plurality of threshold maps relating to a second stage of the multistage actuatable occupant restraining system. The controller is further connected to the crush zone accelerometer and includes means for selecting one of the two threshold maps relating to the second stage of the multistage actuatable occupant restraining system in response to the crush zone acceleration signal, the controller controlling second stage actuation in response to a comparison of the crash velocity signal against the selected one of the two threshold maps.

In accordance with another aspect of the present invention, an apparatus is provided for controlling an actuatable occupant restraining system of a vehicle comprising a crash sensor sensing crash acceleration at a substantially central location of the vehicle and providing a crash acceleration signal indicative of sensed crash acceleration. A crush zone accelerometer is provided spaced from the passenger compartment at a crush zone location of the vehicle and provides a crush zone crash acceleration signal indicative of crash acceleration sensed at the crush zone location. An infinite-impulse-response filter is connected to the crush zone sensor for providing a filtered crush zone acceleration signal. The apparatus further includes a controller connected to the crash sensor centrally located for determining a crash velocity value and a crash displacement value in response to the crash acceleration signal. A stored crash velocity as a function of crash displacement threshold map is also provided. A plurality of stored predetermined crash velocity as a function of crash displacement misuse threshold maps is provided. The controller is further connected to the crush zone accelerometer and to the infinite-impulse-response filter and includes means for selecting one of the stored misuse threshold maps in response to the filtered crush zone acceleration signal. The controller controls actuation of the actuatable occupant restraining system in response to a comparison of the crash velocity signal against the selected misuse threshold maps and the crash velocity as a function of crash displacement threshold map.

In accordance with yet another aspect of the present invention, an apparatus is provided for controlling a multi-stage actuatable occupant restraining system of a vehicle comprising a crash sensor sensing crash acceleration at a substantially central location of the vehicle and providing a crash acceleration signal indicative of sensed crash acceleration. A crush zone accelerometer assembly is provided spaced from the passenger compartment at a crush zone location of the vehicle and provides crush zone crash acceleration signals indicative of crash acceleration sensed at the crush zone location. A controller is connected to the central crash sensor for determining a crash velocity value and a crash displacement value in response to the crash acceleration signal and connected to the crush zone accelerometer assembly for controlling actuation of first and second stages of said multistage actuatable occupant restraining system. The controller determines if a crash event is a symmetric or asymmetric crash event in response to signals from the crush zone acceleration signals and controlling actuation of the second stage in response thereto.

In accordance with another aspect of the present invention, a method is provided for controlling a multistage actuatable occupant restraining system of a vehicle comprising the steps of sensing crash acceleration at a substantially central location of the vehicle and providing a crash acceleration signal indicative of sensed crash acceleration, sensing crash acceleration at a crush zone location of the vehicle and providing a crush zone crash acceleration signal indicative of crash acceleration sensed at the crush zone location, determining a crash velocity value and a crash displacement value in response to the crash acceleration signal, providing a plurality a predetermined crash velocity as a function of crash displacement threshold maps, two of said plurality of threshold maps relating to a second stage of said multistage actuatable occupant restraining system, selecting one of said two threshold maps relating to said second stage of said multistage actuatable occupant restraining system in response to the crush zone acceleration signal, and controlling second stage actuation in response to a comparison of the crash velocity signal against the selected one of said two threshold maps.

In accordance with another aspect of the present invention, a method for controlling an actuatable occupant restraining system of a vehicle comprising the steps of sensing crash acceleration at a substantially central location of the vehicle and providing a crash acceleration signal indicative of sensed crash acceleration, sensing crash acceleration at a crush zone location of the vehicle and providing a crush zone crash acceleration signal indicative of crash acceleration sensed at the crush zone location, filtering the crush zone signal with an infinite-impulse-response filter, determining a crash velocity value and a crash displacement value in response to the crash acceleration signal, providing a crash velocity as a function of crash displacement threshold map is provided and a plurality a predetermined crash velocity as a function of crash displacement misuse threshold maps is provided, selecting one of said misuse threshold maps in response to the filtered crush zone acceleration signal, and controlling actuation of the actuatable occupant restraining system in response to a comparison of the crash velocity signal against said selected misuse threshold map and the crash velocity as a function of crash displacement threshold map.

In accordance with yet another aspect of the present invention, a method is provided for controlling a multistage actuatable occupant restraining system of a vehicle comprising the steps of sensing crash acceleration at a substantially central location of the vehicle and providing a crash acceleration signal indicative of sensed crash acceleration, sensing crush zone accelerometer assembly spaced from the passenger compartment at a crush zone location of the vehicle and providing crush zone crash acceleration signals indicative of crash acceleration sensed at the crush zone location, determining a crash velocity value and a crash displacement value in response to the crash acceleration signal, controlling actuation of first and second stages of said multistage actuatable occupant restraining system, said controller determining if a crash event is a symmetric or asymmetric crash event in response to signals from the crush zone acceleration signals and controlling actuation of the second stage in response thereto.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 7 is a logic control diagram showing control logic for controlling actuation control of pretensioners of the control arrangement of FIG. 2;

FIG. 8 is a logic control diagram showing control logic for controlling actuation control of the first stage of the air bags for the control arrangement of FIG. 2;

FIGS. 13-16 are logic control diagrams showing control logic for selecting an appropriated ΔT algorithm.

DESCRIPTION OF PREFERRED EMBODIMENT

Figure 1:
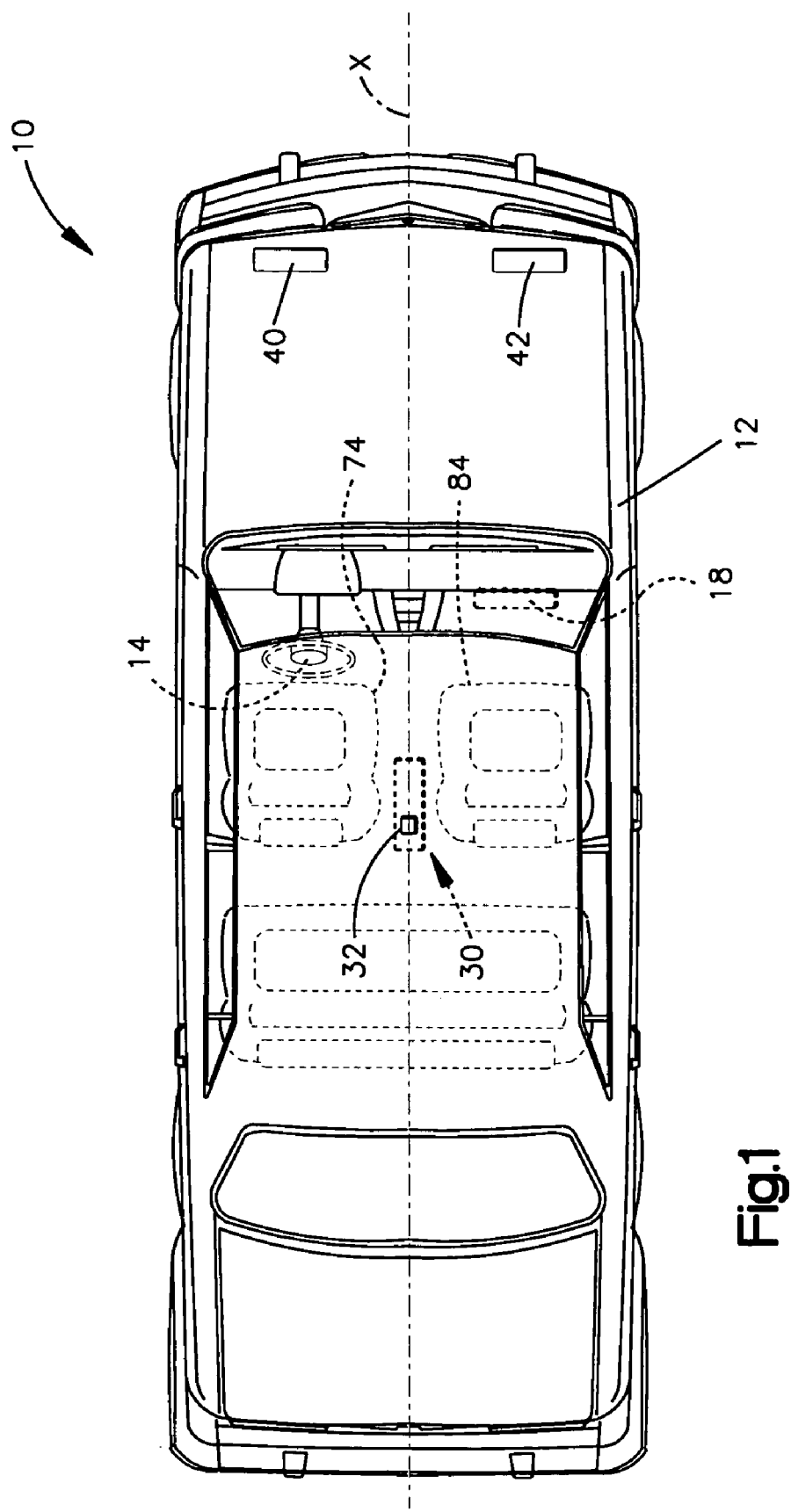
FIG. 1 is a schematic diagram of a vehicle having an actuatable occupant restraining system with a control arrangement in accordance with one exemplary embodiment of the present invention.
Figure 2:
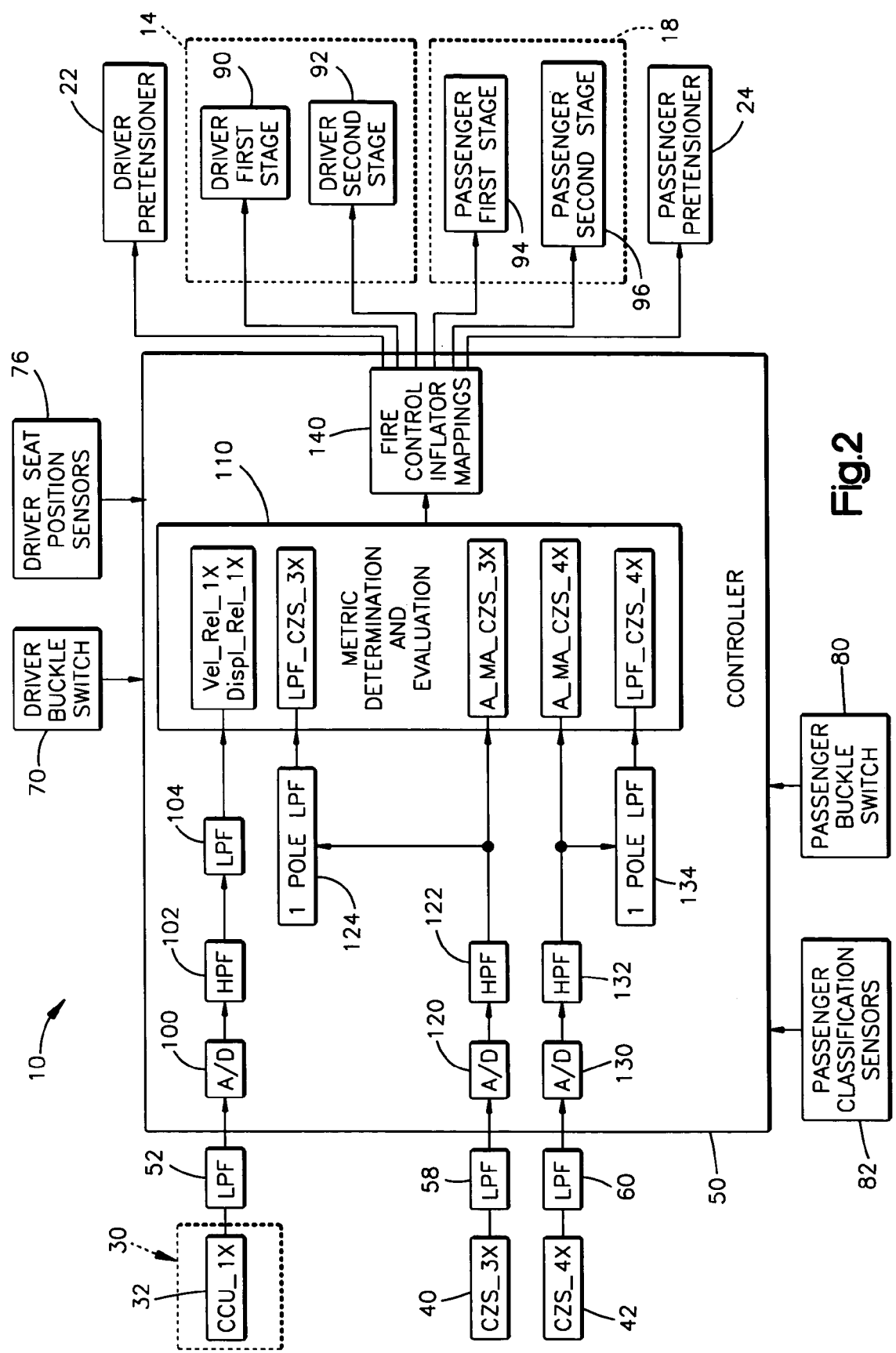
FIG. 2 is a functional block diagram of an exemplary embodiment of a control arrangement for the actuatable occupant restraining system shown in FIG. 1.

Referring to FIGS. 1 and 2, an actuatable occupant restraining system 10, in accordance with an exemplary embodiment of the present invention, is used in a vehicle 12 and includes a driver's side, multistage, front actuatable restraining device 14, and a passenger's side, multistage, front actuatable restraining device 18. The actuatable occupant restraining system 10 further includes an actuatable driver's side pretensioner 22 operative with the driver's seat belt (not shown) in a known manner, and an actuatable passenger's side pretensioner 24 operative with the passenger's seat belt (not shown) in a known manner. The present invention is not limited to actuatable restraining systems using actuatable air bags or actuatable pretensioners but is applicable to any vehicle restraining system having any type of actuatable restraining device.

The occupant restraining system 10 of the described exemplary embodiment of the present invention further includes a crash sensor assembly 30 located at a substantially central location of the vehicle 12. Sensor assembly 30 in accordance with the exemplary embodiment includes a crash acceleration sensor 32 (e.g., an accelerometer) having its axis of sensitivity substantially oriented to sense crash acceleration of the vehicle along the vehicle's X direction (i.e., parallel with the front-to-rear axis of the vehicle) and that provides a crash acceleration signal designated herein as CCU_1X.

The crash acceleration signal CCU_1X can take any of several forms. For example, the crash acceleration signal can have amplitude, frequency, pulse duration, etc., or any other electrical characteristic that varies as a function of the sensed crash acceleration. In accordance with one exemplary embodiment of the present invention, the crash acceleration signal CCU_1X has frequency and amplitude characteristics indicative of the sensed crash acceleration.

In addition to the crash acceleration sensor 32, the occupant restraining system 10 further includes crash acceleration sensors 40, 42 located in a crush zone area of the vehicle 12 spaced away from the occupant or passenger compartment. These crash acceleration sensors 40, 42 are also referred to herein as crush zone acceleration sensors. The crush zone location of the vehicle may be forward of the passenger compartment and may be forward of crumple zone locations of the vehicle. During a vehicle collision, the crush zone location collapses toward the passenger compartment to absorb impact crash energy as is known in the art.

The sensor 40 is located on the driver's side of the vehicle in a crush zone location and has its axis of sensitivity substantially oriented to sense crash acceleration parallel with the vehicle's X-axis. The sensor 42 is located on the passenger's side of the vehicle also in a crush zone location and has its axis of sensitivity substantially oriented to sense crash acceleration parallel with the vehicle's X-axis. The signal output from the driver's side, crush zone sensor 40 is designated herein as CZS_3X and the signal output from the passenger's side, crush zone sensor 42 is designated herein as CZS_4X. These signals may take any of several forms.

In accordance with an exemplary embodiment of the present invention, the crush zone sensors 40, 42 are acceleration responsive sensors (e.g., accelerometers). The signals from the crush zone sensors 40, 42, in accordance with an exemplary embodiment of the present invention, have frequency and amplitude characteristics indicative of the crash acceleration experienced at their associated locations of the vehicle. The crush zone sensors 40, 42, in accordance with an exemplary embodiment of the present invention, are mounted at or near the radiator location of the vehicle.

The crash acceleration signals CCU_1X, CZS_3X, and CZS_4X are provided to a controller 50 through associated hardware low-pass-filters ("LPF") 52, 58, and 60 respectively. The controller 50 is, in accordance with an exemplary embodiment of the present invention, a microcomputer. The present invention contemplates that the functions performed by the microcomputer could be carried out by one or more microcomputers, other digital and/or analog circuitry, and can be assembled on one or more circuit boards or as an application specific integrated circuit ("ASIC"). The microcomputer may interface with other vehicle computers or sensors via a system bus via appropriate interfaces such as through parallel ports, serial ports or a universal serial bus. Any type of communication architecture may be used.

The filters 52, 58 and 60 filter their associated crash acceleration signals to remove frequency components that are not useful in discriminating a vehicle crash event, e.g., frequency components resulting from road noise. Frequencies useful for crash discrimination can be determined through empirical testing of a vehicle platform of interest.

The controller 50 monitors the filtered crash acceleration signals and performs one or more crash analysis algorithms to discriminate whether a vehicle deployment or non-deployment crash event is occurring. Each crash algorithm measures and/or determines values due to the crash event from the crash acceleration signals. These values are used in deployment and actuation decisions by the controller. Such measured and/or determined crash values are also referred to as "crash metrics" and may include crash acceleration, crash energy, crash velocity, crash displacement, crash jerk, etc. Based upon the determined crash metric values, the controller 50 further determines crash severity values for a crash event using crash severity metrics and uses these determined crash severity values in the control of the multistage actuatable restraining devices 14, 18 and the pretensioners 22 and 24. Not only is the actuation of the air bags 14, 18 controlled, but the timing between actuation of the first and second stages of each of the air bags is controlled.

Other driver-associated sensors are used to provide further inputs that may be used by the controller 50 as part of a control algorithm to control the actuatable restraining devices 14 and 22. These sensors may include a driver's buckle switch sensor 70 that provides a signal to controller 50 indicating whether the driver has his associated seat belt buckled. Driver seat position sensors 76 provide seat position information to the controller 50. Other driver-associated sensors are also contemplated such as driver classification sensors such as cameras and a classification neural network system for monitoring driver position, size, classification, and/or driver identification. Weight sensors may also be used.

Other passenger-associated sensors may be used to provide inputs that are used by the controller 50 as part of a control algorithm to control the actuatable restraining devices 18 and 24. These sensors include a passenger's buckle switch sensor 80 that provides a signal to controller 50 indicating whether the passenger has his seat belt buckled. Passenger classification sensors 82, such as cameras and a classification neural network system provides occupant classification data to the controller 50. Other passenger sensors could be used such as passenger's weight sensors located in the passenger's seat 84 to provide a signal indicative of the passenger's sensed weight. Still other sensors could be used that determine whether a child-restraining seat is present on the seat 84. A camera classification system may be used for this purpose.

In an exemplary embodiment of the present invention, the air bag restraining device 14 includes a first actuatable stage 90 and a second actuatable stage 92, e.g., two separate sources of inflation fluid in fluid communication with a single air bag restraining device 14. Each stage 90, 92, has an associated squib (not shown) that, when energized with sufficient current for a sufficient time period, initiates fluid flow from an associated fluid source. When one stage is actuated, a percentage less than 100% of the maximum possible inflation of the restraining device 14 occurs. To achieve 100% inflation, the second stage 92 must be actuated within a predetermined time of the first stage actuation. More specifically, the controller 50 performs a crash algorithm using determined crash metrics and outputs one or more signals to the actuatable restraining device 14 for effecting actuation of one or both actuatable inflation stages 90 and 92 at appropriate times to achieve a desired inflation profile and pressure. The controller 50 typically actuates a pretensioner 22 prior to actuation of the first stage 90 of the air bag 14.

As mentioned, each of the actuatable stages 90, 92 includes an associated squib (not shown) of the type well known in the art. Each squib is operatively connected to an associated source of gas generating material and/or a bottle of pressurized gas. Passing a predetermined amount of electrical current through them for a predetermined time ignites the squibs. Each squib ignites its associated gas generating material and/or pierces its associated pressurized gas bottle. The amount of gas released into the bag is a direct function of the number of stages actuated and the timing of their actuation. The more stages actuated during predetermined times, the more gas present in the air bag. In accordance with an exemplary embodiment of the present invention, the air bag restraining device 14 includes two actuatable stages 90, 92. By way of example, if only one stage is actuated, 40% of the maximum possible inflation pressure occurs. If the two stages are actuated within 5 msec. of each other, 100% of the maximum possible inflation pressure occurs. If the stages are actuated approximately 20 msec. apart, a different, lesser percentage of the maximum possible inflation occurs. By controlling the actuation timing of the multiple stages, the dynamic profile of the bag is controlled, e.g., the inflation rate and the inflation pressure, etc.

The passenger's side restraining device 18 includes a first actuatable stage 94 and a second actuatable stage 96 controlled is a similar manner as described above with regard to the driver's side restraining device 14 to control the percentage of maximum possible inflation pressure of the air bag 18.

Figure 3:
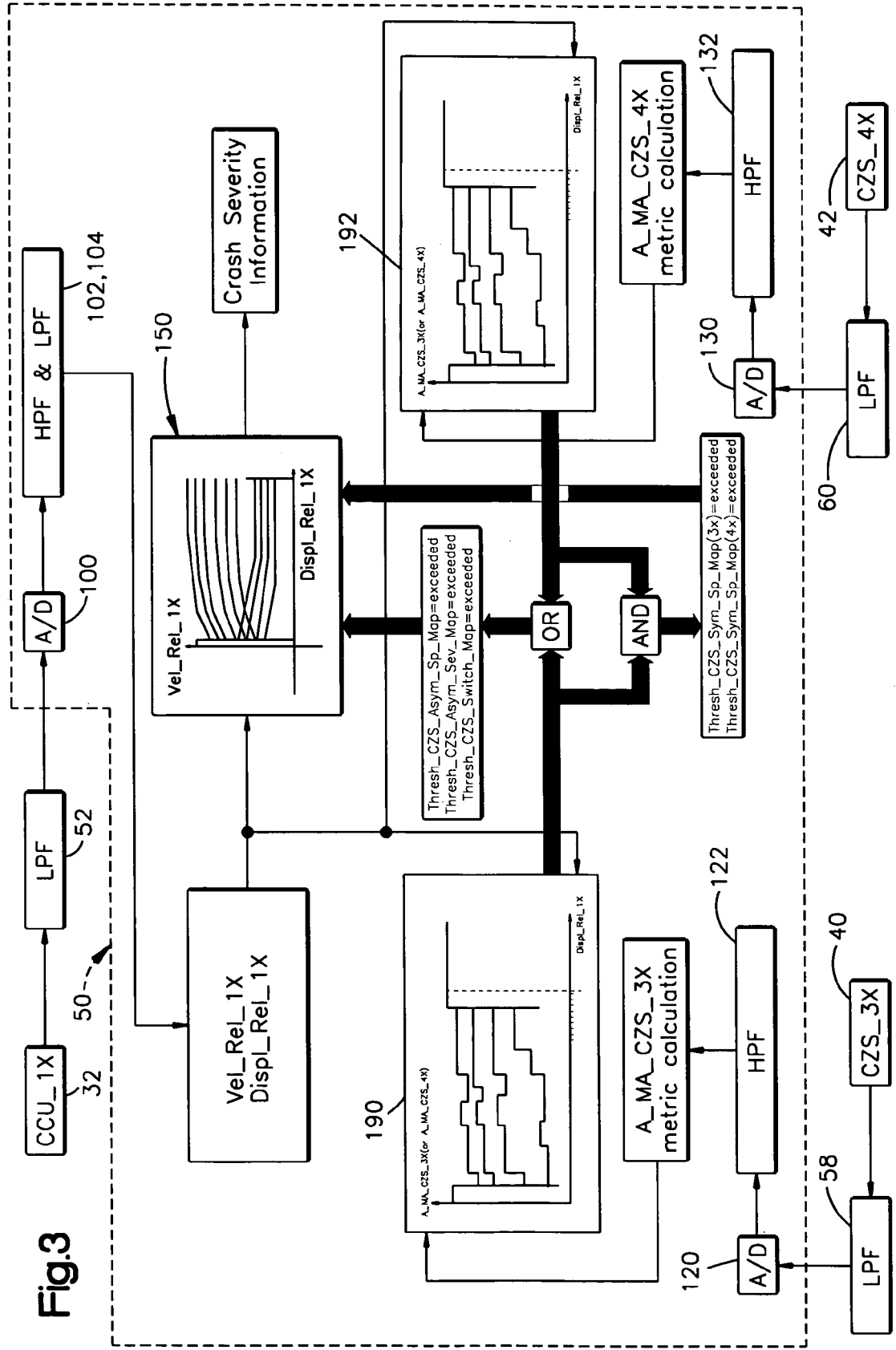
FIG. 3 is a functional block diagram showing portions of the control arrangement of FIG. 2 in greater detail.
Figure 4:
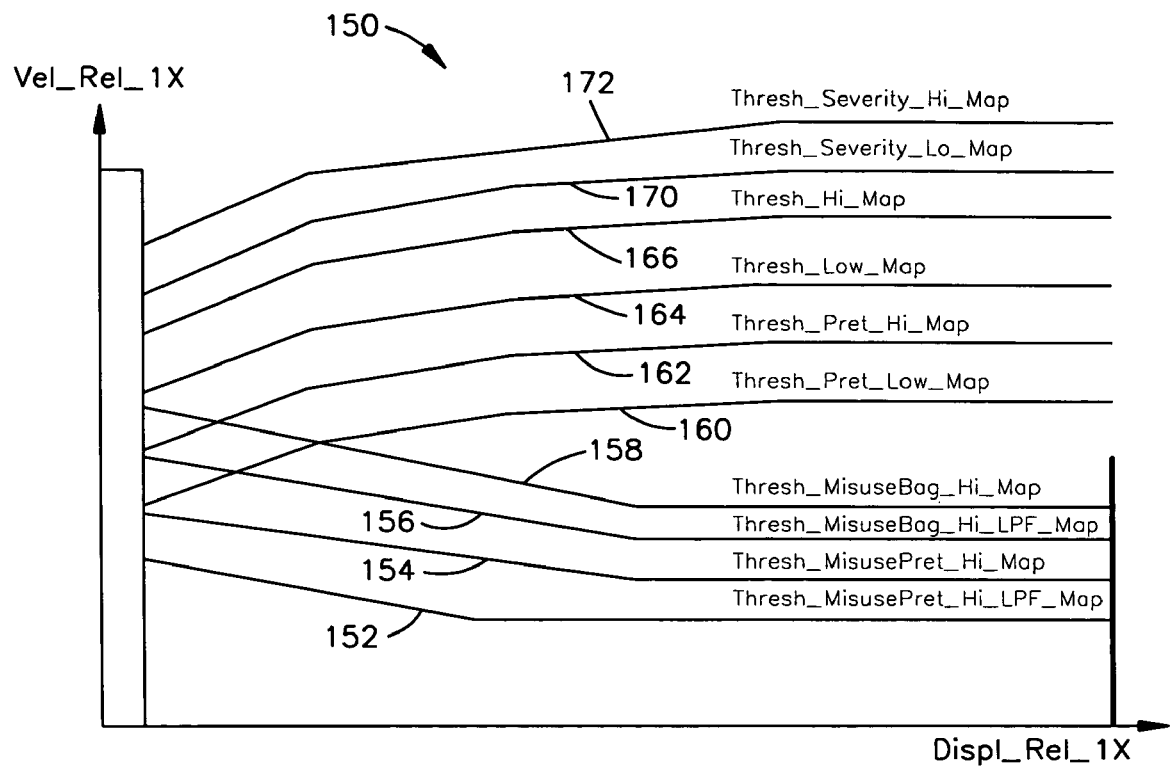
FIG. 4 is a graphical representation of exemplary threshold values or threshold maps having crash velocity values that vary as a function of crash displacement values used by the control arrangement of FIG. 2.

Referring to FIGS. 2, 3, and 4, the low-passed-filtered CCU_1X acceleration signal is converted from an analog signal to a digital signal via an internal analog-to-digital ("A/D") converter 100 of controller 50. The digital CCU_1X signal is then high-passed-filtered ("HPF") using an internal HPF function 102 and then low-passed-filtered ("LPF") using LPF function 104. The digitally filtered CCU_1X signal is then processed by a metric determination and evaluation portion 110 of the controller 50. The metric determination and evaluation portion 110 determines a crash velocity value designated herein as Vel_Rel_1X and a crash displacement value that is designated herein as Displ_Rel_1X. The Vel_Rel_1X value and Displ_Rel_1X value may be determined in accordance with the spring mass damped model disclosed in U.S. Pat. No. 5,935,182 to Foo et al. and U.S. Pat. No. 6,036,225 to Foo et al. The low-passed-filtered CZS_3X acceleration signal is converted from an analog signal to a digital signal via an internal analog-to-digital ("A/D") converter function 120 of controller 50. The digital CZS_3X signal is then high-passed-filtered ("HPF") using an internal HPF function 122 and then low-passed-filtered ("LPF") using a single pole LPF function 124. The filter function 124 is also known in the art as an infinite-impulse-response ("IIR") filter. Both the HPF and LPF CZS_3X signals are processed by a metric determination and evaluation portion 110 of the controller 50. The metric determination and evaluation portion 110 determines from the LPF filter 124 a value designated herein as LPF_CZS_3X based on the single pole filtered value. A moving average value is determined by the metric determination and evaluation portion 110 from the HPF CZS_3x signal and is designated herein as A_MA_CZS_3X. This moving average may be based on any predetermined number of consecutive CZS_3X values such as three consecutive sampled values.

The low-passed-filtered CZS_4X acceleration signal is converted from an analog signal to a digital signal via an internal analog-to-digital ("A/D") converter function 130 of controller 50. The digital CZS_4X signal is then high-passed-filtered ("HPF") using an internal HPF function 132 and then low-passed-filtered ("LPF") using a single pole LPF function 134. The filter function 134 is also known in the art as an infinite impulse response ("IIR") filter. Both the HPF and LPF CZS_4X signals are processed by a metric determination and evaluation portion 110 of the controller 50. The metric determination and evaluation portion 110 determines from the LPF filter 134 a value designated herein as LPF_CZS_4X based on the single pole filtered value. A moving average value is determined by the metric determination and evaluation portion 110 from the HPF CZS_4x signal and is designated herein as A_MA_CZS_4X. This moving average may be based on any predetermined number of consecutive sample values such as three consecutive CZS_4X values.

Determinations to actuate the pretensioners 22, 24 and the air bags 14, and 18 are made within the metric determination and evaluation portion 110 of the controller 50 using control logic described below. Inflation timings between first and second stages of the air bags are controlled using a deployment mapping function 140 of the controller 50 using an inflator mapping scheme, also described below.

Referring to FIG. 4, a plurality of thresholds or maps 150, shown in FIG. 3 are shown enlarged. The threshold maps includes ten different sets of Vel_Rel_1X threshold values that vary as a function of Displ_Rel_1X values. The lower four thresholds are referred to as misuse thresholds and prevent actuation of the pretensioners and airbags that result from non-crash events that produce accelerometer signals, e.g., road noise. Specifically, a first misuse threshold 152 set is designated Thesh_MisusePret_Hi_LPF_Map. A second misuse threshold set 154 is designated Thresh_MisusePret_Hi_Map. A third misuse threshold 156 set is designated Thesh_MisuseBag_Hi_LPF_Map. A forth misuse threshold set 158 is designated Thresh_MisuseBag_Hi_Map.

A first pretensioner threshold set 160 is designated Thresh_Pret_Low_Map. A second pretensioner threshold set 162 is designated Thresh_Pret_Hi_Map. The thresholds 160, 162 are used in the control of the pretensioners 22, 24.

A first threshold set 164 is designated Thresh_Low_Map. A second threshold set 166 is designated Thresh_Hi_Map. The thresholds 164, 166 are used in the control of the first stages 90, 94 of the air bags 14, 18, respectively.

A first Severity threshold set 170 is designated Thresh_Severity_Low_Map. A second Severity threshold set 172 is designated Thresh_Severity_Hi_Map. The thresholds 170, 172 are used in the control of the second stages 92, 96 of the air bags 14, 18, respectively.

The deployment control logic to control actuation of the pretensioners and the air bags is responsive to the crossing of the threshold values or maps shown in FIG. 4, i.e., what threshold the Vel_Rel_1X exceeds as a function of displacement. Even though the controller 50 always compares the Vel_Rel_1X value against all threshold values, deployment may occur in response to less than all thresholds being exceeded. Which thresholds 150 are used in the deployment control process is controlled in response to comparisons of values of signals from crush zone sensors 40, 42. A first comparison is performed in comparison function 190 of controller 50 and a second comparison is performed in comparison function 192 of controller 50.

Figure 5:
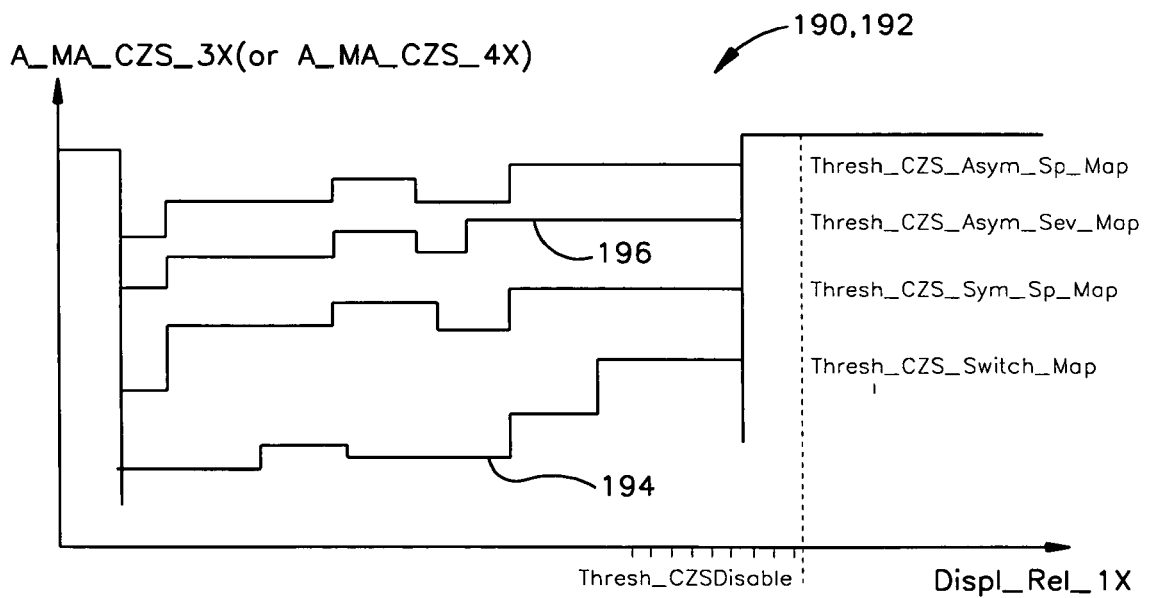
FIG. 5 is a graphical representation of various exemplary threshold values used by the control arrangement of FIG. 2 to control actuation mapping for second stage deployment control.

The threshold values used in the comparisons 190, 192 are shown in FIG. 5. In comparison function 190, A_MA_CZS_3X value (the moving average value determined from the CZS_3X signal) as a function of Displ_Rel_1X is compared against threshold value 194 and the threshold 196. Similarly, the value A_MA_CZS_4X as a function of Displ_Rel_1X is compared against thresholds 194 and 196 in comparison function 192. The results of the two comparison functions 190 and 192 are logically OR'ed so that crossings by either moving average value A_MA_CZS_3X or A_MA_CZS_4X of threshold 194 will result in a lower threshold being used in control of the pretensioner and first stage of the air bag deployments. Specifically, if both of the A_MA_CZS_3X and A_MA_CZS_4X as a function of Displ_Rel_1X are below Thresh_CZS_Switch_Map 194, then the higher threshold values are used, i.e., 162, and 166. If either of the A_MA_CZS_3X and A_MA_CZS_4X as a function of Displ_Rel_1X is above Thresh_CZS_Switch_Map 194, then the lower threshold values are used, i.e., 160, and 164. The results of the two comparison functions 190 and 192 are logically OR'ed so that crossings by either moving average value A_MA_CZS_3X or A_MA_CZS_4X of threshold 196 will result in a lower threshold being used in control of the second stage of the air bag deployments. Specifically, if both of the A_MA_CZS_3X and A_MA_CZS_4X as a function of Displ_Rel_1X are below Thresh_CZS_Asym_Sev_Map 196, then the higher threshold value is used, i.e., 172. If either of the A_MA_CZS_3X and A_MA_CZS_4X as a function of Displ_Rel_1X is above Thresh_CZS_Asym_Sev_Map 196, then the lower threshold value is used, i.e., 170.

Figure 6:
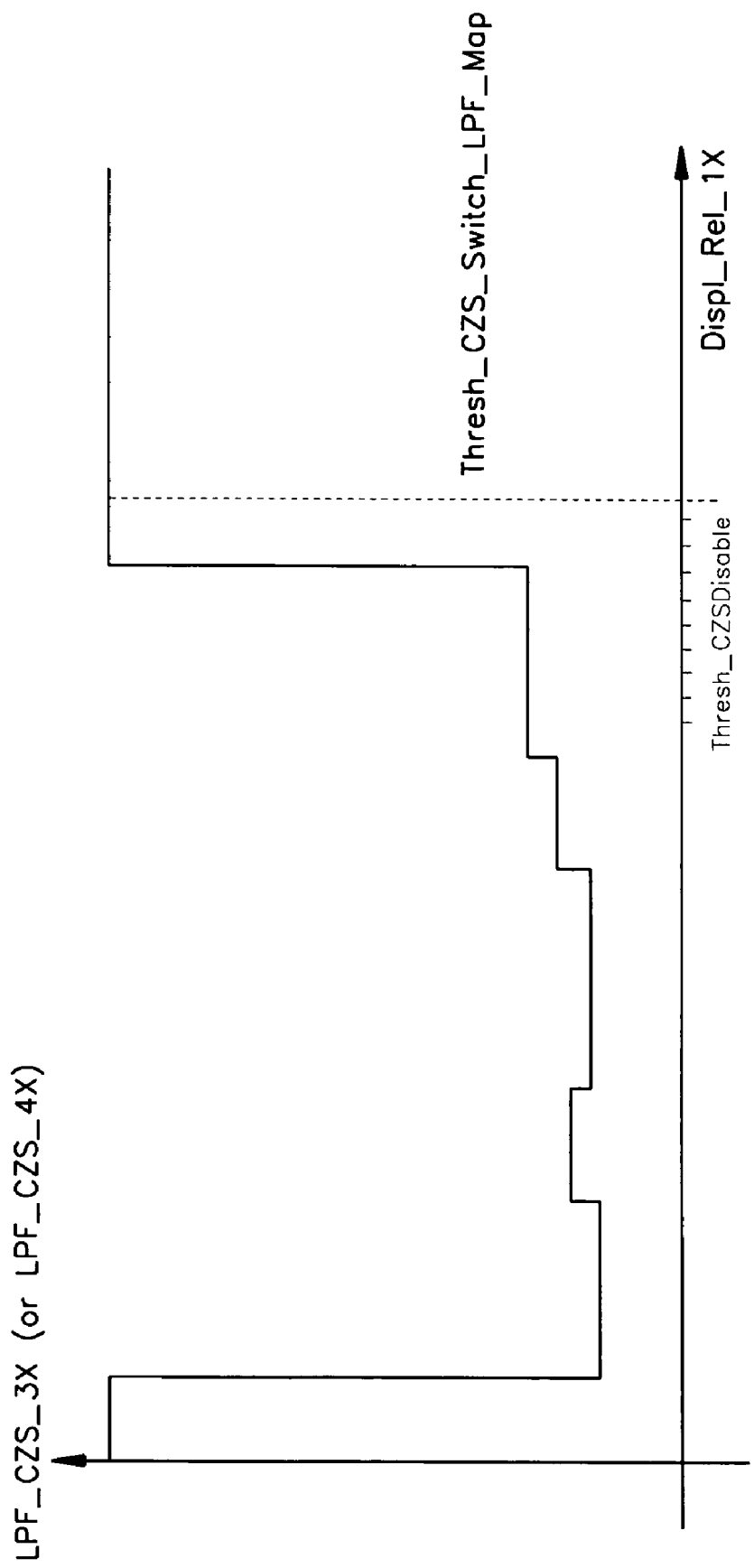
FIG. 6 is a graphical representation of an exemplary threshold value used to compare a low-passed-filtered crush zone accelerometer signal by the control arrangement of FIG. 2.

An additional criteria used in the deployment logic control is a shown in FIG. 6 in which a determination is made by controller 50 as to whether either of the single pole LPF values, i.e., either LPF_CZS_3X or LPF_CZS_4X, as a function of Displ_Rel_1X exceeds a predetermined threshold value Thresh_CZS_Switch_LPF_Map.

Referring to FIG. 7, the control logic for is shown for controlling actuation of the pretensioners. The pretensioners are actuated when (1) Vel_Rel_1X exceeds the Thresh_Pret_Hi_Map threshold 162 AND (2) Vel_Rel_1X exceeds the Thresh_MisusePret_Hi_Map threshold 154 OR (3) Vel_Rel_1X exceeds the Thresh_MisusePret_Hi_LPF_Map threshold 152 AND (4) LPF_CZS_3X OR LPF_CZS_4X exceeded their associated Thresh_CZS_Switch_LPF_Map_3X and Thresh_CZS_Switch_LPF_Map_4X, OR (5) Vel_Rel_1X exceeds Thresh_Pret_Lo_Map threshold 160 AND (6) either Thresh_CZS_Switch Map_3X OR Thresh_CZS_Switch_Map_4X is exceeded by their associated moving average values determined in comparison functions 190, 192 (Also seen in FIG. 5). The specific ANDing and ORing functions are depicted in FIG. 7 and will be well understood by those skilled in the art. If these logic criteria of FIG. 7 are met, then the pretensioners 22, 24 are actuated.

The control logic for controlling actuation of the first stage 90, 94 of the air bag restraining devices 14, 18, respectively, is shown in FIG. 8. Referring to FIG. 8, the first stages 90, 94 of the air bags are actuated when (1) Vel_Rel_1X exceeds the Thresh_Hi_Map threshold 166 AND (2) Vel_Rel_1X exceeds the Thresh_MisuseBag_Hi_Map threshold 158 OR (3) Vel_Rel_1X exceeds the Thresh_MisuseBag_H_LPF_Map threshold 156 AND (4) LPF_CZS_3X OR LPF_CZS_4X exceeded their associated Thresh_CZS_Switch_LPF_Map_3X or Thresh_CZS_Switch_LPF_Map_4X, OR (5) Vel_Rel_1X exceeds Thresh_Lo_Map threshold 164 AND (6) either Thresh_CZS_Switch Map_3X OR Thresh_CZS_Switch_Map_4X is exceeded by their associated moving average values determined in comparison functions 190, 192 (Also seen in FIG. 5). The specific ANDing and ORing functions are depicted in FIG. 8 and will be well understood by those skilled in the art. If the logic criteria in FIG. 8 are met, then the first stages 90, 94 of the air bags 14, 18 are actuated.

Control of the second stages of the air bags does not necessarily occur at the time of crossing of the second threshold, but in accordance with a mapping function and other criteria described below. FIG. 5 is further used by the controller 50 to control actuation of the second stages of the air bags by comparing the A_MA_CZS_3X and A_MA_CZS_4X moving average values against other thresholds.

Figure 9:
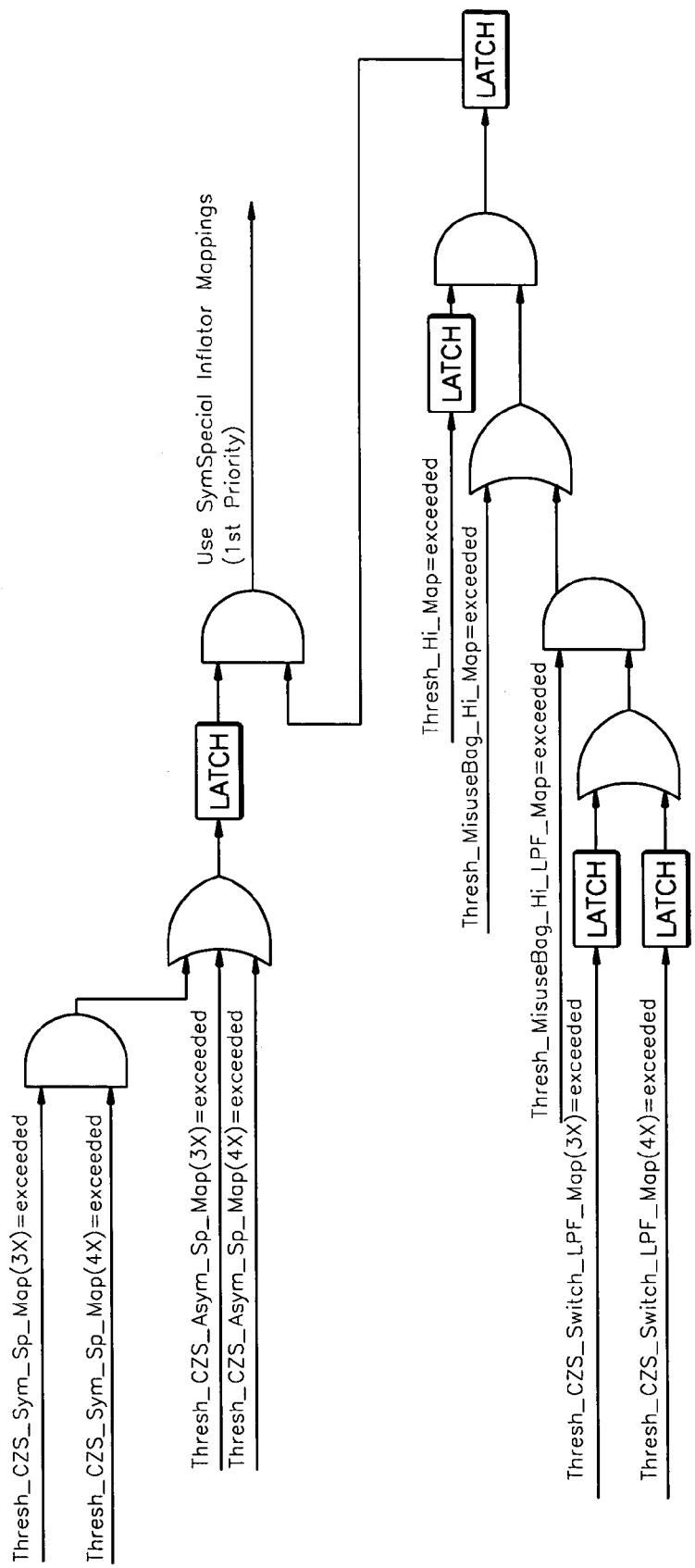
FIGS. 9-12 are logic control diagrams showing control logic for selecting the mapping priority for actuation of the deployment of the second stage of the air bags of the control arrangement of FIG. 2.

Referring to FIG. 9, the logic control is depicted showing the criteria needed for selection of the symmetrical special inflator mapping $1^{st}$ priority for the control of the second inflators. In accordance with this exemplary embodiment of the present invention, (1) the LPF_CZS_3X must exceed Thresh_CZS_Switch_LPF_Map_3X OR LPF_CZS_4X must exceed Thresh_CZS_Switch_LPF Map_4X AND, (2) Vel_Rel_1X exceeds the Thresh_MisuseBag_Hi_LPF_Map threshold 156 OR (3) Vel_Rel_1X exceeds the Thresh_MisuseBag_Hi_Map threshold 158 OR (4) Vel_Rel_1X exceeds the Thresh_Hi_Map threshold 166 AND (5) A_MA_CZS_3X exceed Thresh_CZS_Asym_Sp_Map_3X OR A_MA_CZS_4X exceed Thresh_CZS_Asym_Sp_Map_4X OR (A_MA_CZS_3X exceed Thresh_CZS_Sym_Sp_Map_3X AND A_MA_CZS_4X exceed Thresh_CZS_Sym_Sp_Map_4X). The specific ANDing and ORing functions are depicted in FIG. 9 and will be well understood by those skilled in the art. If these criteria are met, the symmetric $1^{st}$ priority mapping is selected.

Figure 10:
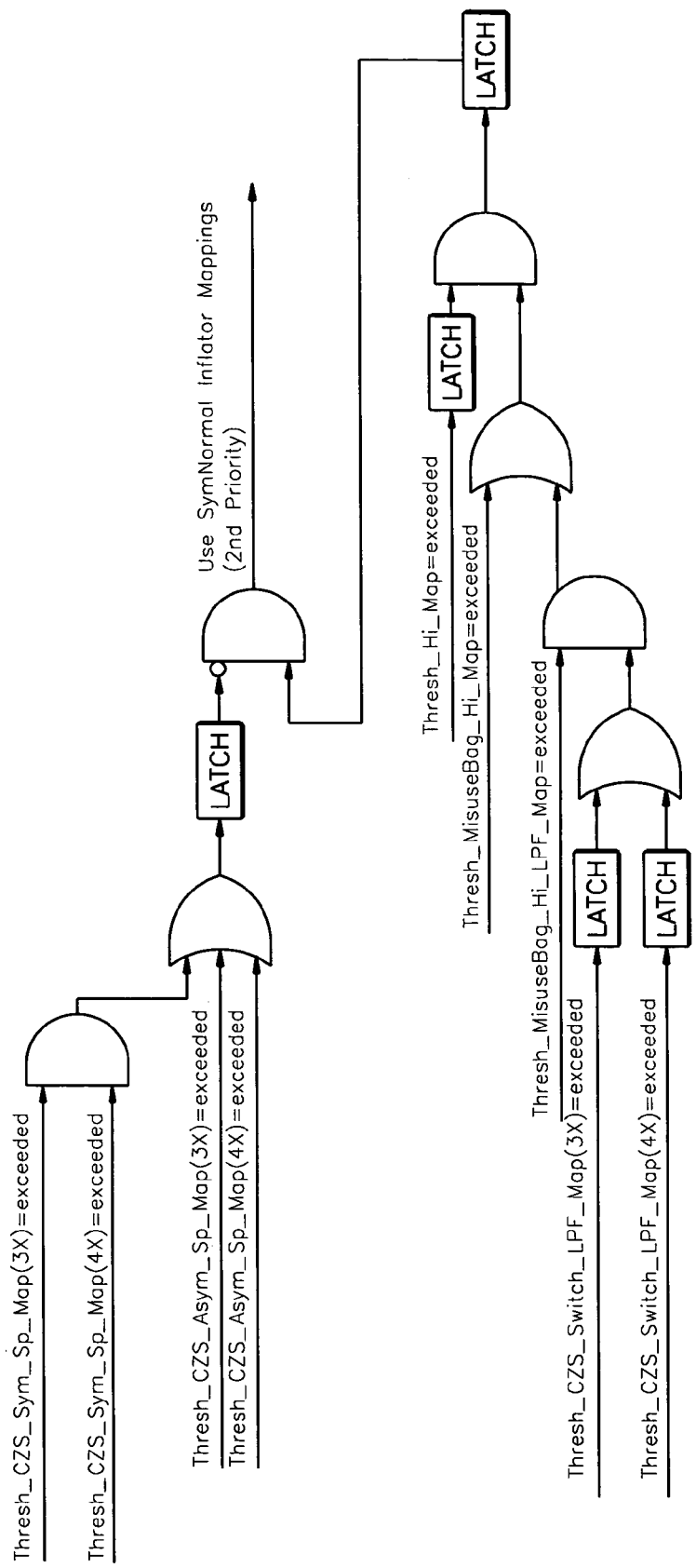

Referring to FIG. 10, the logic control is depicted showing the criteria needed for selection of the symmetrical special inflator mapping $2^{nd}$ priority for the control of the second inflators. In accordance with this exemplary embodiment of the present invention, (1) the LPF_CZS_3X must exceed Thresh_CZS_Switch_LPF_Map_3X OR LPF_CZS_4X must exceed Thresh_CZS_Switch_LPF_Map_4X AND, (2) Vel_Rel_1X exceeds the Thresh_MisuseBag_Hi_LPF_Map threshold 156 OR (3) Vel_Rel_1X exceeds the Thresh_MisuseBag_Hi_Map threshold 158 OR (4) Vel_Rel_1X exceeds the Thresh_Hi_Map threshold 166 AND the following criteria is NOT met: (5) A_MA_CZS_3X exceed Thresh_CZS_Asym_Sp_Map_3X OR A_MA_CZS_4X exceed Thresh_CZS_Asym_Sp_Map_4X OR (A_MA_CZS_3X exceed Thresh_CZS_Sym_Sp_Map_3X AND A_MA_CZS_4X exceed Thresh_CZS_Sym_Sp_Map_4X). In effect, the result of portion (5) must be a logic zero. The specific ANDing and ORing functions are depicted in FIG. 10 and will be well understood by those skilled in the art. If these criteria are met, the symmetric $2^{nd}$ priority mapping is selected.

Figure 11:
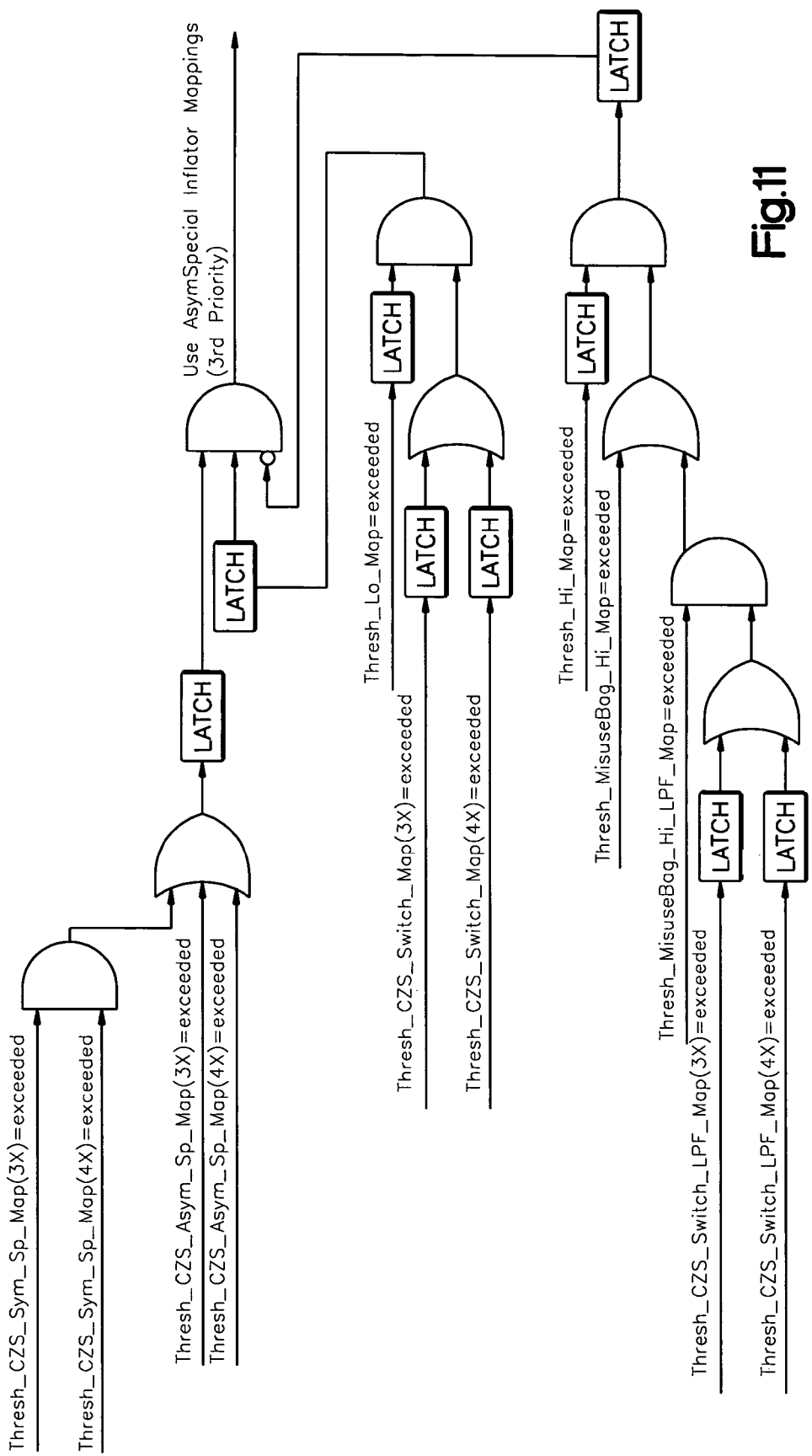

Referring to FIG. 11, the logic control is depicted showing the criteria needed for selection of the asymmetrical special inflator mapping $3^{rd}$ priority for the control of the second inflators. In accordance with this exemplary embodiment of the present invention, the following logic must produce a logic zero result: (1) the LPF_CZS_3X must exceed Thresh_CZS_Switch_LPF_Map_3X OR LPF_CZS_4X must exceed Thresh_CZS_Switch_LPF_Map_4X AND, (2) Vel_Rel_1X exceeds the Thresh_MisuseBag_Hi_LPF_Map threshold 156 OR (3) Vel_Rel_1X exceeds the Thresh_MisuseBag_Hi_Map threshold 158 OR (4) Vel_Rel_1X exceeds the Thresh_Hi_Map threshold 166

AND the remainder of the logic producing a HIGH result including (5) A_MA_CZS_3X exceed Thresh_CZS_Asym_Sp_Map_3X OR A_MA_CZS_4X exceed Thresh_CZS_Asym_Sp_Map_4X OR (A_MA_CZS_3X exceed Thresh_CZS_Sym_Sp_Map_3X AND A_MA_CZS_4X exceed Thresh_CZS_Sym_Sp_Map_4X) AND (6) (A_MA_CZS_3X exceeding Thresh_CZS_Switch_Map_3X OR A_MA_CZS_4X exceeding Thresh_CZS_Switch_Map_4X) AND Vel_Rel_1X exceeding Thresh_Lo_Map 164. If these criteria are met, the asymmetric $3^{rd}$ priority mapping is selected. The specific logic ANDing and ORing are depicted in FIG. 11 and will be well understood by one skilled in the art.

Figure 12:
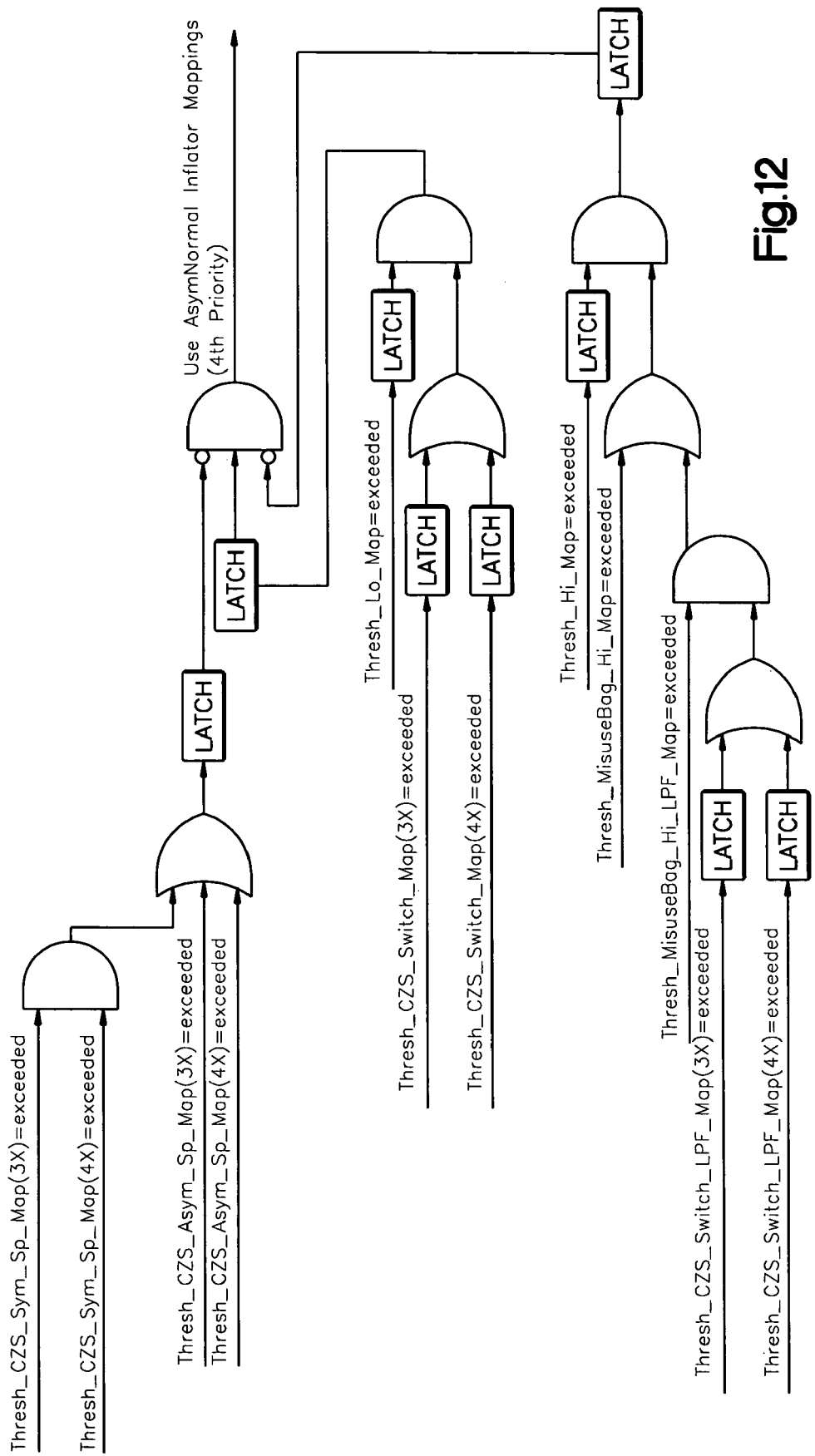

Referring to FIG. 12, the logic control is depicted showing the criteria needed for selection of the asymmetrical special inflator mapping $4^{th}$ priority for the control of the second inflators. In accordance with this exemplary embodiment of the present invention, the following logic must produce a logic zero result: (1) the LPF_CZS_3X must exceed Thresh_CZS_Switch_LPF_Map_3X OR LPF_CZS_4X must exceed Thresh_CZS_Switch_LPF_Map_4X AND, (2) Vel_Rel_1X exceeds the Thresh_MisuseBag_Hi_LPF_Map threshold 156 OR (3) Vel_Rel_1X exceeds the Thresh_MisuseBag_Hi_Map threshold 158 OR (4) Vel_Rel_1X exceeds the Thresh_Hi_Map threshold 166 AND (5) A_MA_CZS_3X exceed Thresh_CZS_Asym_Sp_Map_3X OR A_MA_$_{CZS}$_4X exceed Thresh_CZS_Asym_Sp_Map_4X OR (A_MA_CZS_3X exceed Thresh_CZS_Sym_Sp_Map_3X AND A_MA_CZS_4X exceed Thresh_CZS_Sym_Sp_Map_4X) AND the remainder of the logic produce a HIGH result (6) (A_MA_CZS_3X exceeding Thresh_CZS_Switch_Map_3X OR A_MA_CZS_4X exceeding Thresh_CZS_Switch_Map_4X) AND Vel_Rel_1X exceeding Thresh_Lo_Map 164. If these criteria are met, the asymmetric $4^{th}$ priority mapping is selected. The specific logic ANDing and ORing are depicted in FIG. 12 and will be well understood by one skilled in the art.

After the first stage initiation, the controller 50 starts four internal counters indicated as ΔT timers and performs four algorithms that identifies which of four possible ΔT algorithms is occurring. The first one to be satisfied, as indicated by a digital HIGH, stops that timer. That time is then used in the second stage mapping for control of the second stage deployment control. This ΔT control logic is depicted in FIGS. 13-16.

Referring to FIG. 13, the following criteria must be met: (1) the LPF_CZS_3X must exceed Thresh_CZS_Switch_LPF_Map_3X OR LPF_CZS_4X must exceed Thresh_CZS_Switch_LPF_Map_4X AND, (2) Vel_Rel_1X exceeds the Thresh_MisuseBag_Hi_LPF_Map threshold 156 OR (3) Vel_Rel_1X exceeds the Thresh_MisuseBag_Hi_Map threshold 158 OR (4) Vel_Rel_1X exceeds the Thresh_Hi_Map threshold 166 AND (5) Vel_Rel_1X must exceed Thresh_Severity_Hi_Map 172. If these criteria are met, ΔT (algorithm)(Hi to Hi) is met and that timer is identified and used in the mapping. The specific ANDing and ORing functions are shown in FIG. 13 and will be well understood by those skilled in the art.

Figure 14:
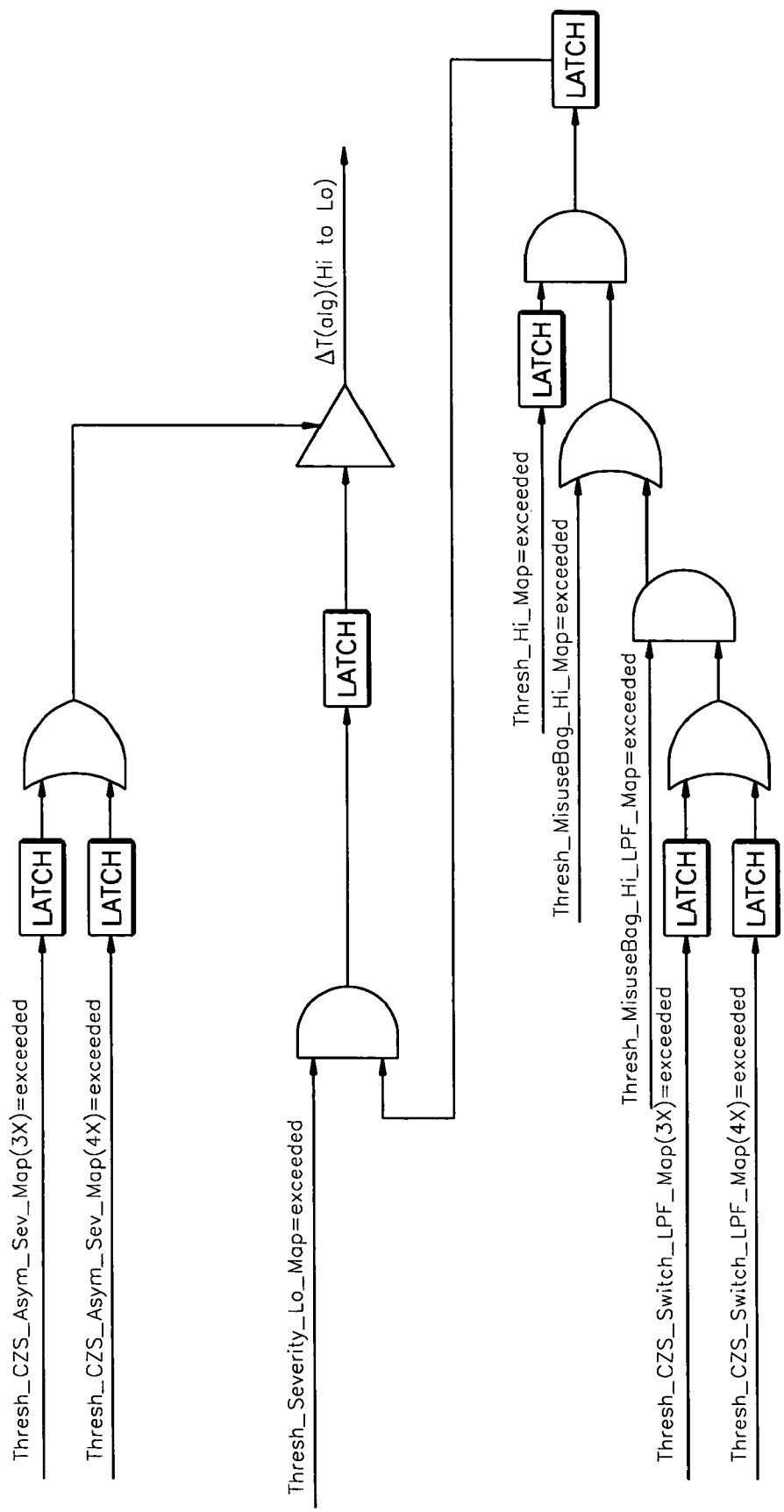

Referring to FIG. 14, the following criteria must be met: (1) the LPF_CZS_3X must exceed Thresh_CZS_Switch_LPF_Map_3X OR LPF_CZS_4X must exceed Thresh_CZS_Switch_LPF_Map_4X AND, (2) Vel_Rel_1X exceeds the Thresh_MisuseBag_Hi_LPF_Map threshold 156 OR (3) Vel_Rel_1X exceeds the Thresh_Misuse Bag_Hi_Map threshold 158 OR (4) Vel_Rel_1X exceeds the Thresh_Hi_Map threshold 166 AND (5) Vel_Rel_1X must exceed Thresh_Severity_Lo_Map 170. If these criteria are met, the ΔT(algorithm)(Hi to Lo) is identified when A_MA_CZS_3X exceeds Thresh_CZS_Asym_Sev_Map_3X OR A_MA_CZS_4X exceeds Thresh_CZS_Asym_Sev_Map_4X and that counter is used in the mapping. The specific ANDing and ORing functions are shown in FIG. 14 and will be well understood by those skilled in the art.

Referring to FIG. 15, if the following criteria are met: (1) A_MA_CZS_3X exceeds Thresh_CZS_Asym_Sev_Map_3X OR A_MA_CZS_4X exceeds Thresh_CZS_Asym_Sev_Map_4X AND (2) Vel_Rel_1X exceeds Thresh_Lo_Map 164 AND Vel_Rel_1X exceeds Thresh_Severity_Hi_Map 172 then ΔT(algorithm)(Lo to Hi) is identified and that counter is used in the mapping. The specific ANDing and ORing functions are shown in FIG. 15 and will be well understood by those skilled in the art.

Figure 16:
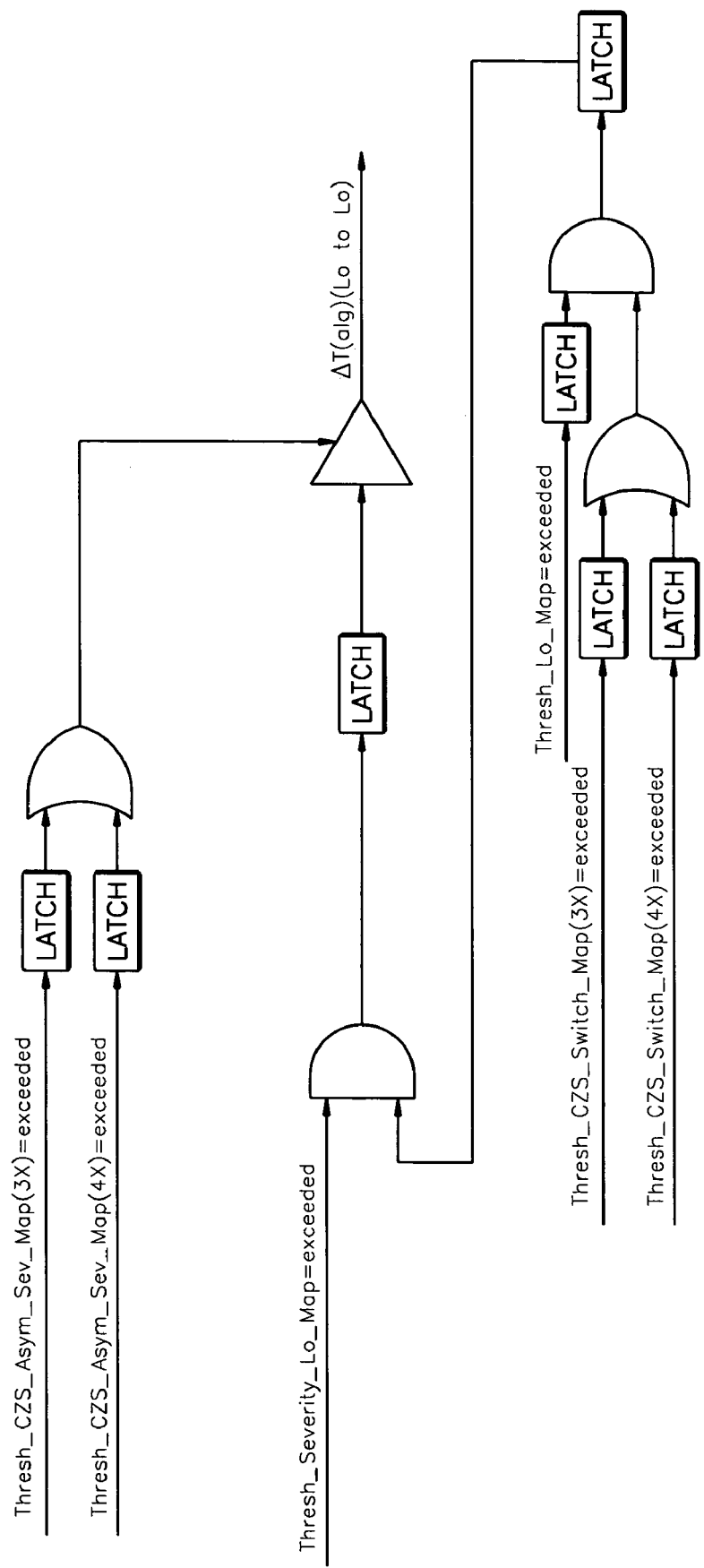

Referring to FIG. 16, if the following criteria are met: (1) A_MA_CZS_3X exceeds Thresh_CZS_Asym_Sev_Map_3X OR A_MA_CZS_4X exceeds Thresh_CZS_Asym_Sev_Map_4X AND (2) Vel_Rel_1X exceeds Thresh_Lo_Map 164 AND Vel_Rel_1X exceeds Thresh_Severity_Lo_Map 170, the ΔT(algorithm)(Lo to Lo) is identified when A_MA_CZS_3X exceeds Thresh_CZS_Asym_Sev_Map_3X OR A_MA_CZS_4X exceeds Thresh_CZS_Asym_Sev_Map_4X and that counter or timer is used in the mapping. The specific ANDing and ORing functions are shown in FIG. 16 and will be well understood by those skilled in the art.

Figure 17:
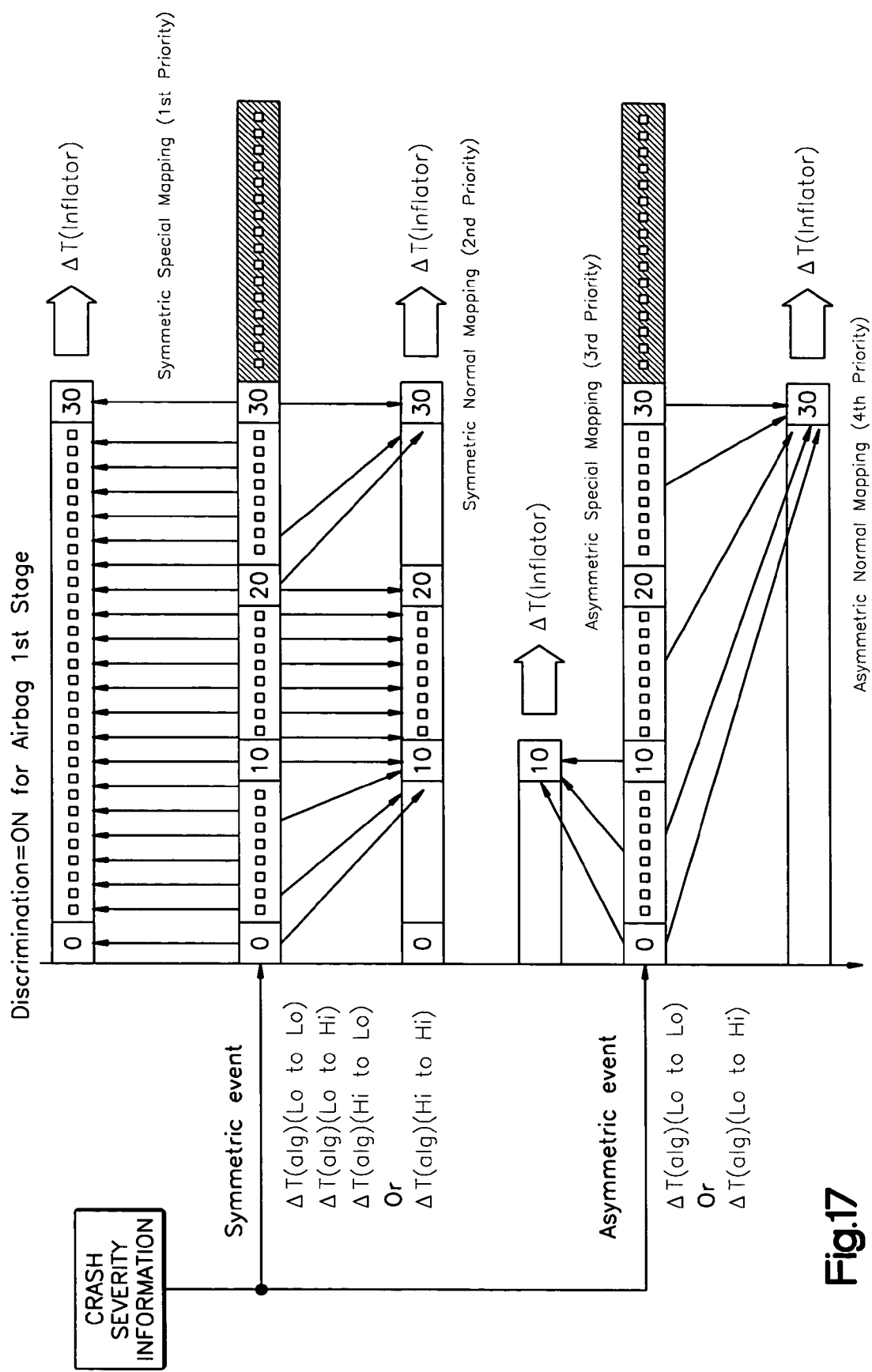
FIG. 17 is a schematic diagram illustrating inflator mapping for the second stage deployment control.

Referring to FIG. 17, mapping for control of second stage deployment is shown for an exemplary embodiment of the present invention. A plurality of timers are started after first stage initiation. A ΔT algorithm is identified performed to determine which ΔT is active so as to use that counter in the mapping for the second stage inflation process. If a symmetric crash event is determined to be occurring, and $1^{st}$ priority mapping has been logically selected, then a one-to-one timing occurs between the crossing of the second threshold and the deployment signal for the second actuation from 1-30 milliseconds. If a symmetric crash event were determined to be occurring and a second priority mapping was logically selected, then actuation of the second stage would occur 10 milliseconds after the first stage if the second threshold crossing was between 1-10 milliseconds of the first stage crossing, a one-to-one timing control between 10-20 milliseconds, and deployment 30 milliseconds after first deployment if the second crossing occurred between 21-30 milliseconds after the first stage deployment.

If an asymmetric crash event was determined to be occurring and a $3^{rd}$ priority mapping was logically selected, the second stage deployment would occur 10 milliseconds after the first stage deployment. If an asymmetric crash event was determined to be occurring and a $4^{th}$ priority mapping was logically selected, the second stage deployment would occur 30 milliseconds after first stage deployment.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling a multistage actuatable occupant restraining system of a vehicle comprising:

a crash sensor sensing crash acceleration at a substantially central location of the vehicle and providing a crash acceleration signal indicative of sensed crash acceleration;

a crush zone accelerometer assembly spaced from the passenger compartment at a crush zone location of the vehicle and providing a crush zone crash acceleration signal indicative of crash acceleration sensed at the crush zone location; and a controller connected to the central crash sensor for determining a crash velocity value and a crash displacement value in response to the crash acceleration signal and connected to the crush zone accelerometer assembly for controlling actuation of first and second stages of said multistage actuatable occupant restraining system, said controller determining if a crash event is a symmetric or asymmetric crash event in response to signals from the crush zone acceleration signals and controlling actuation of the second stage in response thereto.

2. The apparatus of claim 1 wherein said controller includes stored deployment map timings that map relative times between crossing of threshold values and times of second stage actuations, said controller selecting a timing map in response to a values from the crush zone sensor assembly.

3. The apparatus of claim 1 wherein the crush zone sensor assembly includes two crush zone sensors, said controller selecting an asymmetric timing map then either crush zone sensor signal reaches a predetermined value.

4. The apparatus of claim 1 wherein the crush zone sensor assembly includes two crush zone sensors, said controller selecting an symmetric timing map then both crush zone sensor signals reach a predetermined value.

5. A method for controlling a multistage actuatable occupant restraining system of a vehicle comprising the steps of:

sensing crash acceleration at a substantially central location of the vehicle and providing a crash acceleration signal indicative of sensed crash acceleration;

sensing crush zone accelerometer assembly spaced from the passenger compartment at a crush zone location of the vehicle and providing crush zone crash acceleration signals indicative of crash acceleration sensed at the crush zone location;

determining a crash velocity value and a crash displacement value in response to the crash acceleration signal;

controlling actuation of first and second stages of said multistage actuatable occupant restraining system, said controller determining if a crash event is a symmetric or asymmetric crash event in response to signals from the crush zone acceleration signals and controlling actuation of the second stage in response thereto.

6. The method of claim 5 further comprising the steps of storing deployment map timings that map relative times between crossing of threshold values and times of second stage actuations, and selecting a timing map in response to a value from the crush zone sensor assembly.

7. The method of claim 5 wherein the step of sensing crush zone acceleration includes sensing crush zone acceleration at two locations and the step of selecting includes selecting an asymmetric timing map when either crush zone sensor signal reaches a predetermined value.

8. The method of claim 5 wherein the step of sensing crush zone acceleration includes sensing crush zone acceleration at two locations and wherein the step of selecting includes selecting an symmetric timing map then both crush zone sensor signals reach a predetermined value.

* * * * *